July 29, 1947.  H. J. MARSCHAK  2,424,763
SPEED COMPUTING AND MAP READING DEVICE
Filed Feb. 15, 1945  2 Sheets-Sheet 1
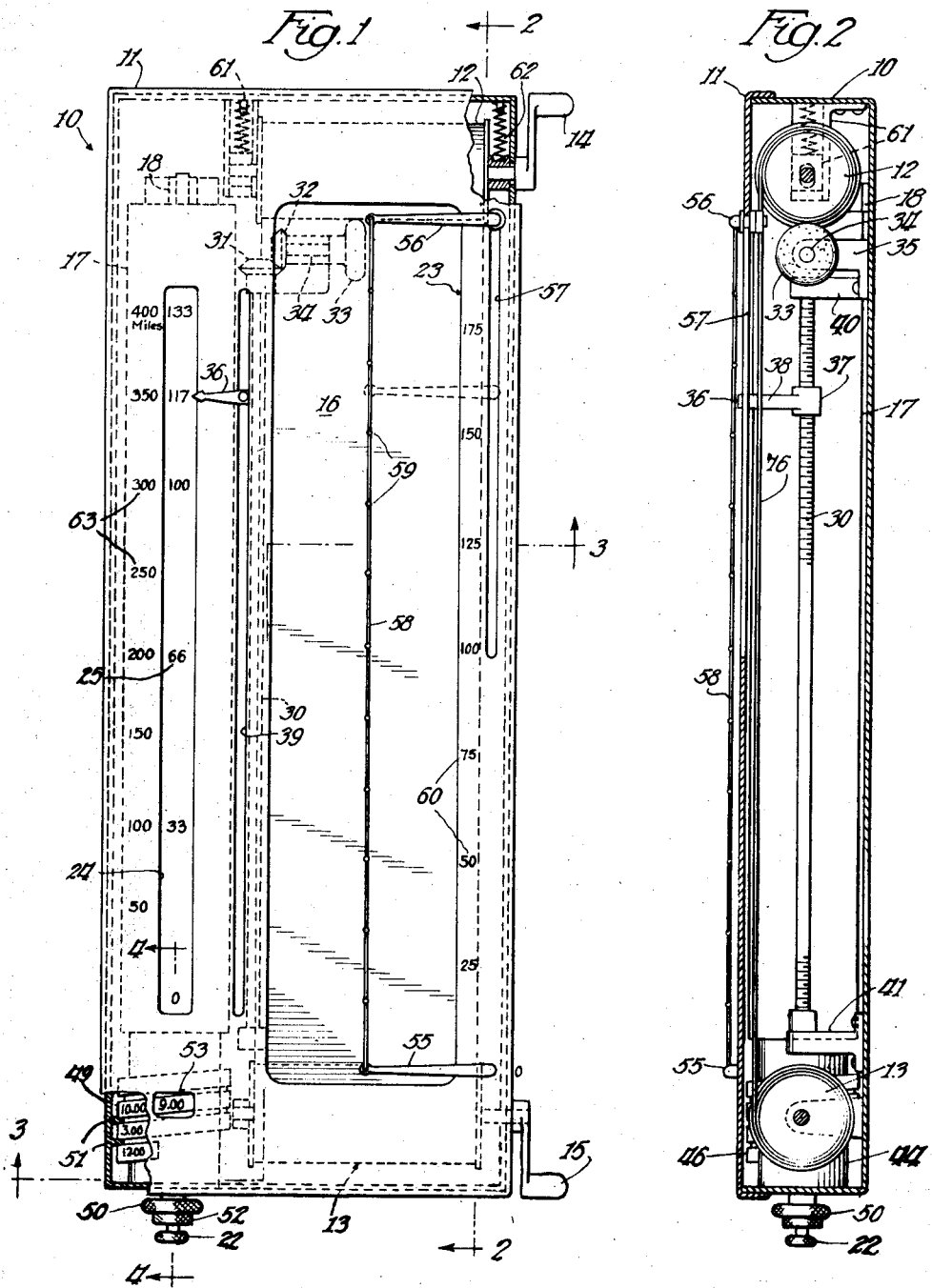
Inventor
Howard J. Marschak.
By: Zabel Carlson Gritzbaugh & Wells
Attys.

July 29, 1947.  H. J. MARSCHAK  2,424,763
SPEED COMPUTING AND MAP READING DEVICE
Filed Feb. 15, 1945  2 Sheets-Sheet 2
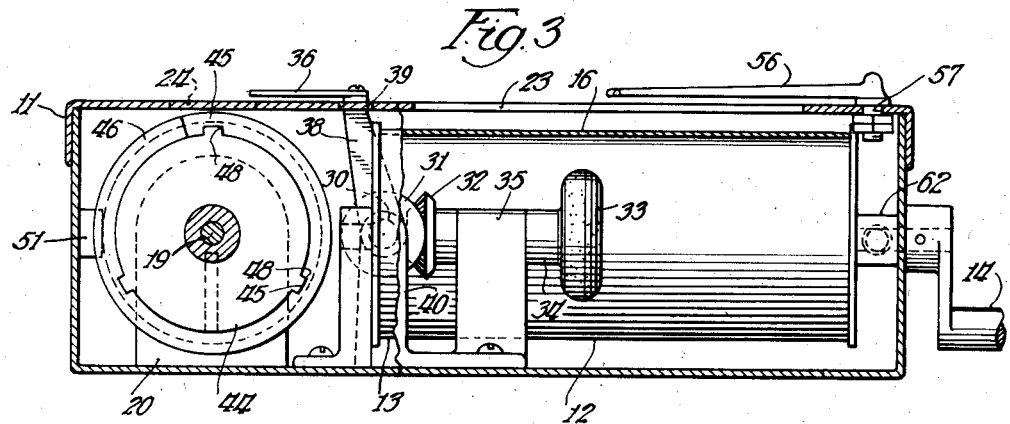
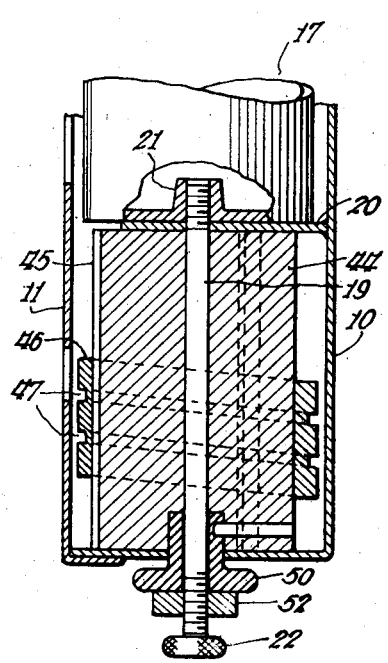
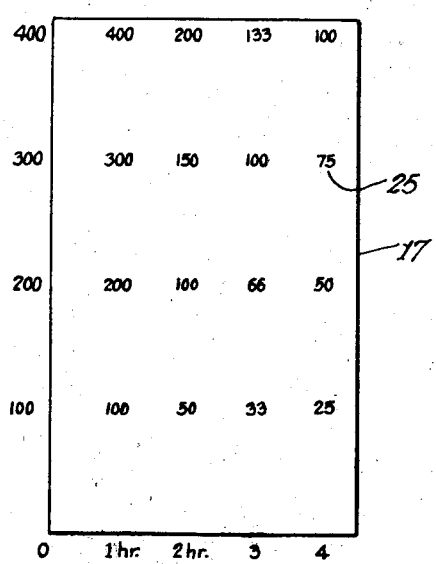
Inventor
Howard J. Marschak
By: Zabel Carlson Gritzbaugh & Wells
Attys.

Patented July 29, 1947

2,424,763

UNITED STATES PATENT OFFICE 2,424,763

SPEED COMPUTING AND MAP READING DEVICE

Howard J. Marschak, Chicago, Ill.

Application February 15, 1945, Serial No. 578,015

5 Claims. (Cl. 235—87)

This invention relates to a speed computing and map reading device.

It is a primary object of this invention to provide a simple device by means of which an aviator, motorist, or the like, may compute his average speed of travel.

My invention consists primarily in a device for holding a strip map, which embodies means to advance the strip with respect to the holding device so that that portion of the map which shows the territory through which the operator is travelling, will be exposed to view. The computing means is driven in part by the means which advances the strip map, and in part manually, or by time responsive means if so desired, so that the reading of the device will be in terms of distance per unit of time, or velocity.

It is a further object of my invention to provide in connection with a computing device of the character above pointed out, improved indicating means associated with the computing device to facilitate the manual, or time responsive setting thereof.

Since the operation of the device requires that the operator locate his present position on the map, the computing device has associated therewith an improved means to facilitate said location. It is a further object of my invention to provide in combination with such a speed computing and map reading device, improved means for facilitating the location of one's position on the map.

It is still another object of this invention to provide an improved speed computing and map reading device which is portable, of light weight and compact dimensions, and which is simple in its construction and comparatively inexpensive to manufacture.

Other objects, features and advantages will become apparent as this description proceeds.

With reference now to the drawings, in which like reference numerals designate like parts, Fig. 1 is a plan view of a preferred embodiment of my invention, certain portions being broken away;

Fig. 2 is a section taken along line 2—2 of Fig. 1;

Fig. 3 is a section taken along line 3—3 of Fig. 1;

Fig. 4 is a detailed enlarged section taken along line 4—4 of Fig. 1; and

Fig. 5 is a development of a portion of the speed computing roller, showing the arrangement of the indicia thereon.

The reference numeral 10 designates generally a box or housing in which the parts are mounted, the box being provided with a cover 11. Rollers 12 and 13 are suitably mounted at the ends of the box, and may be driven by cranks 14 and 15, respectively, which extend through the side walls of the box. A strip map 16 is mounted on the rollers 12 and 13. A strip map is the type of map commonly used by aviators which shows the line of flight between two points and the territory on either side of the line of flight for a short distance only. Such maps can be drawn to a comparatively large scale because the strip form of the map makes for easy handling thereof.

As shown in Fig. 2, the map is wound around roller 12 and the free end secured to roller 13. Operation of the crank 15 will cause the strip to be advanced, thereby enabling the operator to keep the territory over which he is flying in view. A window or opening 23 is provided in the cover 11 for this purpose. The advance of the map is in the direction toward the observer, or in the downward direction as viewed in Fig. 1.

Mounted within the box 10, at the side of the strip map 16 and the rollers 12 and 13, is a longitudinally disposed computing roller 17. One end of the computing roller is journalled in a suitable journal 18, and the other end is supported by means of a shaft 19 which passes through a support 20. The end of the shaft 19 is threaded and takes into a threaded boss 21 formed in the end of the computing roller 17, as shown in Fig. 4. The other end of the shaft 19 extends through the end wall of the box 10 and terminates in a knob 22. Rotation of the knob will cause rotation of the computing roller. A window or opening 24 is provided in the cover 11 to expose a portion of the roller 17, and make visible certain indicia 25, which are carried on the surface of the roller.

Disposed between the computing roller 17 and the other parts of the device is a worm 30, journalled in suitable brackets 40 and 41. The worm is driven by the advance of the strip map 16 by means of a pair of bevel gears 31 and 32, which are driven by the engagement of a rubber wheel 33 with the roller 12. The rubber wheel 33 and bevel gear 32 are mounted on a shaft 34, suitably journalled in a support 35. The spacing between the shaft 34 and the axis of the roller 12 is such that the rubber wheel 33 engages the surface of the roller 12, or that portion of the map which overlies the surface. The rubber wheel is preferably made of sponge rubber or the like so that the decreasing thickness of the roll 12 may be compensated for. Although the worm could be driven directly by one of the cranks, I prefer to have it driven by some means, such as the rubber wheel 33 which directly engages the strip map. Thus the rotation of the worm 30 will be proportional to the linear displacement of the map.

A pointer 36 is carried by a tapped member 37 which cooperates with the worm 30. The tapped member 37 has an upstanding arm 38 which extends through the slot 39 in the cover 11, and the pointer 36 is secured to the arm 38. Thus rotation of the tapped member with respect to the housing is prevented, with the result that the pointer 36 will be shifted away from the observer as the strip map is advanced.

It will be seen therefore that the position of the pointer 36 is proportional to the advance of the map. This means that the position of the pointer would indicate the distance traveled on a scale 63, provided that the map has been advanced so that the present position of the aviator is opposite a base line which is indicated by a bracket 55.

Means are provided to facilitate the determination of the proper angle through which the computing roller 17 is to be rotated. Said angle should be proportional to the elapsed time, and the above means include an adjustably mounted setting device which is calibrated in current time.

A cylinder 44 is rotatably mounted on shaft 19, and is provided with keys 45. A sleeve 46, having cooperating keyways 48 is slidably mounted on the cylinder 44. The sleeve is provided with a spiral groove 47 which is engaged by a projection 51, so that rotation of the cylinder 44 will cause an axial shifting of the sleeve 46. The sleeve is provided with spirally arranged indicia 49. An opening 53 is provided in the cover 11 which opening overlies one course of the spiral indicia. Thus it will be seen that the cylinder 44 may be rotated through more than 360°, and one of the courses of spiral indicia will always be in registry with the opening.

A knob 50 is secured to the cylinder 44 for rotating the same. A shaft 19 extends through the knob 50, and a lock nut 52 is provided on the shaft in order that the cylinder 44 may be secured in a fixed angular position with respect to the computing roller 17.

The arrangement of the indicia 25 on the computing roller 17 is diagrammatically shown in Fig. 5, in developed form. The abscissa of any point on the development represents the distance traveled, and the ordinate represents the elapsed time. The number which comprise the indicia 25, are arranged in columns, the numbers indicating the various speeds by means of which a numerical value may be assigned to any particular point. This numerical value is a function of the coordinates of a particular point, and is derived by dividing the distance by the elapsed time.

In the operation of the device, it is necessary to locate one's position on the strip map. Means are provided to facilitate this operation. A rubber band 58 is tensioned between a fixed bracket 55 and a sliding bracket 56, the latter being mounted in a slot 57 in the cover 11. The rubber band is provided with a plurality of knots 59, or other marking means, which represent definite time intervals. That portion of the sliding bracket 56 which extends through the slot 57, may be of rectangular cross section, so that it will bind against the walls of the slot, due to the tension of the rubber band 58. Therefore, the sliding bracket 56 can be adjusted to any desired position, and will remain in that position. A set screw may be provided to achieve the same result, if desired.

Indicia 60 are provided on the cover 11 next to the slot 57, these indicia representing velocity. To locate one's position on the map, the operator sets the sliding bracket 56 at a point opposite his estimated air speed. The knots divide the rubber band 58 into twelve equal divisions corresponding to five minute intervals. Thus one's position on the map may be approximated by measuring along the calibrated rubber band, the time elapsed since the last speed computation. The rubber band affords a means of proportionally dividing the distance between the brackets into equal time intervals.

The operation of the device has been explained in detail in connection with the description of the various parts thereof. Assuming that at six o'clock one starts on a flight, the sleeve 46 is adjusted with respect to the computing roller 17, so that "6:00" appears through the opening 53 when the computing roller 17 is in its "0" position, by rotating knob 50. Since the cylinder 44 and the computing roll 17 are secured with respect to each other by the lock nut 52, the cylinder 44, and hence the sleeve 46, may be adjusted with respect to the computing roll 17 by loosening the lock nut 52 and then setting the computing roll 17 to zero, and the sleeve 46 so that it reads "6:00." The lock nut 52 is then tightened up. At this time, the strip map 16 is placed on the rollers, and the position of the starting point is disposed beneath the fixed bracket 55. The pointer 36 will at this time, be opposite a "0" on the computing roller 17. Assuming that the projected flight is for a distance of 400 miles, and that speed calculations have been made at 30 minute intervals, the last such calculation having been made at 8:30. If at 9:00 o'clock it is desired to make another calculation of the average speed, the aviator's present location on the strip is found by means of the knotted rubber band 58, in the manner heretofore described. The crank 15 is then turned to bring the position on the map down to the base line, thus advancing the pointer 36 to the position shown in Fig. 1. The knob 22 is then rotated in the counterclockwise direction until the present time shows through the opening 53, the present time in this instance being "9:00." Thus the column of indicia, which corresponds to that column designated "3 hours" in the development shown in Fig. 5, is brought into registry with the opening 24. The number "117" opposite the pointer 36 indicates the average speed throughout the past 3 hours, the position of the pointer being proportional to the 350 miles already traveled. It will be understood that the development shown in Fig. 5 is merely illustrative of the arrangement of the speed values of the computing roller. In actual practice, it might be considered as desirable to have a column for each 15 minutes interval, or, if the computing roller 17 were of sufficient diameter, to have a column for whatever smaller time intervals might appear to be desirable. The distance between the numbers in any column is proportional to the speed values represented by said numbers which fact facilitates the interpolation, in the event that the pointer is not directly opposite a number.

Similarly, the indicia on the sleeve 46 may indicate any desired fractions of an hour. Although the computing roller 17 may be limited to a size sufficient to compute speeds on flights not exceeding 4 or 5 hours, it is considered desirable to provide the sleeve 46 with indicia extending through 16 or 17 hours, in order that the sleeve may be adjusted so that a direct time reading may be taken for flights made at any hour of the day.

With the arrangement shown, it is not necessary for the operator to make any subtractions to determine the elapsed time; the reading through the opening 53 can be set to correspond with the time shown by the operator's watch.

Of course, if desired, suitable clockwork may be provided for rotating the shaft 19 and the speed computing roller 17, thus eliminating the manual operation.

Although only a preferred embodiment of my invention has been shown and described, herein, it is understood that various modifications and changes may be made therein without departing from the scope thereof. The drawings and the foregoing description are deemed to be illustrative only and my invention to be limited only by the appended claims.

I claim:

1. In a strip map speed computing device having means to advance the strip map so that a position on the map will register with a predetermined position on the computing device, means to facilitate the location of said map position comprising an elastic member, means for indicating subdivisions on said elastic member corresponding to time intervals, and means for supporting said elastic member at two points, said means being adjustable whereby the length of said elastic member may be varied, and indicia to indicate the distance between said adjustable supporting means in terms of velocity, said elastic means overlying said strip map, whereby the location of said map position for a given estimated speed, may be determined by measuring elapsed time along the subdivisions of said elastic member.

2. A speed computing device comprising a housing, a map having a starting point and mounted in said housing for linear displacement to align another point on said map with a base line on said housing, indicating means driven by said map as it is being displaced, the driving connection between the two being such that said indicating means is disposed in a zero position when said starting point is aligned with said base line, and indicia carrying means underlying said indicating means, and adapted to be shifted in a direction perpendicular to the movement of said indicating means to selectively expose one column of a series of columns of indicia for cooperation with said indicating means, a separate column being provided for each of several time intervals representing the time elapsed in travelling between those two places corresponding to said starting point and said other point on said map, said indicia designating velocity.

3. A speed computing device comprising a housing having a base line, a pair of spaced rollers mounted in said housing, a strip map having a starting point and mounted on said rollers for linear displacement to indicate in an exposed position opposite said base line a selected location, a wheel mounted for engagement with said strip map and driven thereby as it is displaced, a pointer driven by said wheel away from the base position, and a chart mounted adjacent said pointer and carrying a plurality of columns of numbers, the values of the numbers of each column being a function of their distance from said base position, and means to shift said chart to expose one or the other of said columns for registry with the path traversed by said pointer, the values of the numbers in the different columns representing the average velocities of an airplane flight between said starting point and said selected location for different time intervals, whereby average speed for a given flight may be indicated by shifting said chart so that that column is exposed which corresponds to the time interval consumed in flying from said starting point to said selected location.

4. A speed computing device comprising a housing, a strip map mounted in said housing for linear displacement whereby a point on the map may be aligned with a predetermined base line on said housing, a chart mounted in said housing having indicia representing velocity aligned in rows and columns, row indicating means, column indicating means, and means engaging said strip map and being driven thereby as it is being displaced for driving one of said indicating means, the other of said indicating means being manually adjustable.

5. A speed computing device comprising a housing, a map mounted in said housing for linear displacement whereby a point on the map may be aligned with a predetermined base line on said housing, a chart having indicia representing velocity aligned in rows and columns, row indicating means, column indicating means, means engaging said strip map and being driven thereby as it is being displaced for driving one of said indicating means, and manual means for driving the other indicating means, said column indicating means comprising a window in said housing of a size to expose a whole column, and a roll on which said chart is mounted so that one or the other of said columns will be exposed through said window, the indicia in each column being arranged so that the distance between any given indicia and the bottom of the column is proportional to the velocity value indicated by said indicia and the velocity values of all of the indicia in a given column representing the average speeds of flights of various distances for a given time interval, whereby average speed of a flight between that point on said strip map which was opposite said base line when said row indicating means was opposite the base of said column, and another point on said map which has been aligned with said base line may be indicated by adjusting said column indicating means so that the time interval represented by the exposed column is the time interval which has elapsed in flying from said first mentioned point to said second mentioned point.

HOWARD J. MARSCHAK.

REFERENCES CITED

The following references are of record in the file of this patent:

UNITED STATES PATENTS

| Number | Name | Date |
| --- | --- | --- |
| 277,627 | Stettner | May 15, 1883 |
| 1,503,076 | Tillman | July 29, 1924 |
| 1,553,194 | Slowey | Sept. 8, 1925 |
| 1,741,676 | Borel | Dec. 31, 1939 |
| 2,218,815 | Eaton | Oct. 22, 1940 |
| 2,324,453 | Albers | July 13, 1943 |